US011157023B2

(12) United States Patent
Silva de Araujo et al.

(10) Patent No.: US 11,157,023 B2
(45) Date of Patent: Oct. 26, 2021

(54) AUTOMATIC RELOCATION OF A VEHICLE BASED ON PROXIMITY

(71) Applicant: INTERNATIONAL BUSINESS MACHINES CORPORATION, Armonk, NY (US)

(72) Inventors: Diogo Tadeu Silva de Araujo, Cedar Park, TX (US); Bruno dos Santos Silva, Mckinney, TX (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 16/432,526

(22) Filed: Jun. 5, 2019

(65) Prior Publication Data

US 2020/0387179 A1   Dec. 10, 2020

(51) Int. Cl.
   *G05D 1/10*   (2006.01)
   *B64C 39/02*   (2006.01)
   *G05D 1/00*   (2006.01)

(52) U.S. Cl.
   CPC .......... *G05D 1/106* (2019.05); *B64C 39/024* (2013.01); *G05D 1/0011* (2013.01); *B64C 2201/146* (2013.01)

(58) Field of Classification Search
   CPC combination set(s) only.
   See application file for complete search history.

(56) References Cited

U.S. PATENT DOCUMENTS 7,330,117 B2   2/2008   Ferguson
9,317,036 B2   4/2016   Wang
9,529,360 B1   12/2016  Melamed
10,074,284 B1   9/2018  Priest
10,156,631 B2  12/2018  Parker
10,157,546 B2  12/2018  Godwin
(Continued)

FOREIGN PATENT DOCUMENTS

WO   2006025915 A1   3/2006
WO   2017091575 A1   6/2017

OTHER PUBLICATIONS

Cross, "Six vehicle crash raises questions about drones at emergency scenes", May 17, 2018, https://cbsaustin.com/news/local/six-vehicle-crash-raises-questions-about-drones-at-emergency-scenes, 3 pages.

(Continued)

*Primary Examiner* — Thomas G Black
*Assistant Examiner* — Anthony M Gartrelle
(74) *Attorney, Agent, or Firm* — Kenneth Han

(57) ABSTRACT

A method, computer system, and computer program product for using a radio frequency trigger to move an unmanned aerial vehicle from an incoming vehicle path are provided. The embodiment may include receiving, by a processor, a radio frequency signal transmitted from a vehicle or an emergency response center. The embodiment may also include determining whether an unmanned aerial vehicle is in flight within a pre-configured threshold radius from the first responder vehicle or emergency response center. The embodiment may further include in response to determining the unmanned aerial vehicle is within the pre-configured radius, activating a "return home" function. The embodiment may also include commanding the unmanned aerial vehicle to fly out of the threshold radius.

20 Claims, 5 Drawing Sheets

(56) References Cited

U.S. PATENT DOCUMENTS

| | | | |
|---|---|---|---|
| 2015/0339931 A1* | 11/2015 | Yu | G08G 5/006 |
| 2017/0261999 A1 | 9/2017 | Van Voorst | |
| 2018/0313945 A1 | 11/2018 | Parker | |
| 2019/0080514 A1* | 3/2019 | Nasi | G06T 19/006 |
| 2019/0295428 A1* | 9/2019 | Holmgren | G08G 5/0069 |

OTHER PUBLICATIONS

Dronewallah, "Knowledge Base: What is Return to Home on a drone?", Return To Home on a Drone: Explained!, 7 pages, Dec. 17, 2015, http://www.rcdronearena.com/2015/12/17/what-is-one-key-return-to-home-on-a-drone-quadcopter/.

Federal Aviation Administration, "Researchers Release Report on Drone Airborne Collisions", U.S. Department of Transportation, https://www.faa.gov/news/updates/?newsId=89246&omniRss=news_updatesAoc&cid=101_N_U, Page last modified: Nov. 28, 2017, accessed Apr. 8, 2019, 2 pages.

Forrest, "17 drone disasters that show why the FAA hates drones", Tech Republic, https://www.techrepublic.com/article/12-drone-disasters-that-show-why-the-faa-hates-drones/, Jun. 13, 2018, pp. 1-10.

Michel, "Counter-Drone Systems", Center for the Study of the Drone at Bard College, Feb. 20, 2018, 23 pages, http://dronecenter.bard.edu/counter-drone-systems/.

Short-Wave, "Shortwave Frequency Bands", accessed Apr. 8, 2019, 2 pages, https://www.short-wave.info/index.php?feature-frequencies.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

AUTOMATIC RELOCATION OF A VEHICLE BASED ON PROXIMITY

BACKGROUND

The present invention relates, generally, to the field of computing, and more particularly to utilizing radio frequency triggers to relocate unmanned vehicles for an emergency.

Unmanned vehicles, including land, air, or sea-based vehicles, are typically combined with a client computing device and a system of communications between them. The use of unmanned vehicles may operate with various degrees of autonomy: either under remote control by a human operator or autonomously by onboard computers. The use of unmanned vehicles is rapidly expanding to commercial, scientific, recreational, agricultural and other various applications. Unmanned vehicles are now used for surveillance, product deliveries, aerial photography and racing for leisure. Unmanned vehicles are typically equipped with position and movement sensors to monitor information about the aircraft state. Non-cooperative sensors are able to detect targets autonomously, so they are used for separation assurance and collision avoidance. Most unmanned vehicles use radio frequencies for remote control and exchange of video and other data.

SUMMARY

According to one embodiment, a method, computer system, and computer program product for using a radio frequency trigger to move an unmanned aerial vehicle from an incoming vehicle path are provided. The embodiment may include receiving, by a processor, a radio frequency signal transmitted from a vehicle or an emergency response center. The embodiment may also include determining whether an unmanned aerial vehicle is in flight within a pre-configured threshold radius from the first responder vehicle or emergency response center. The embodiment may further include in response to determining the unmanned aerial vehicle is within the pre-configured radius, activating a "return home" function. The embodiment may also include commanding the unmanned aerial vehicle to fly out of the threshold radius.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
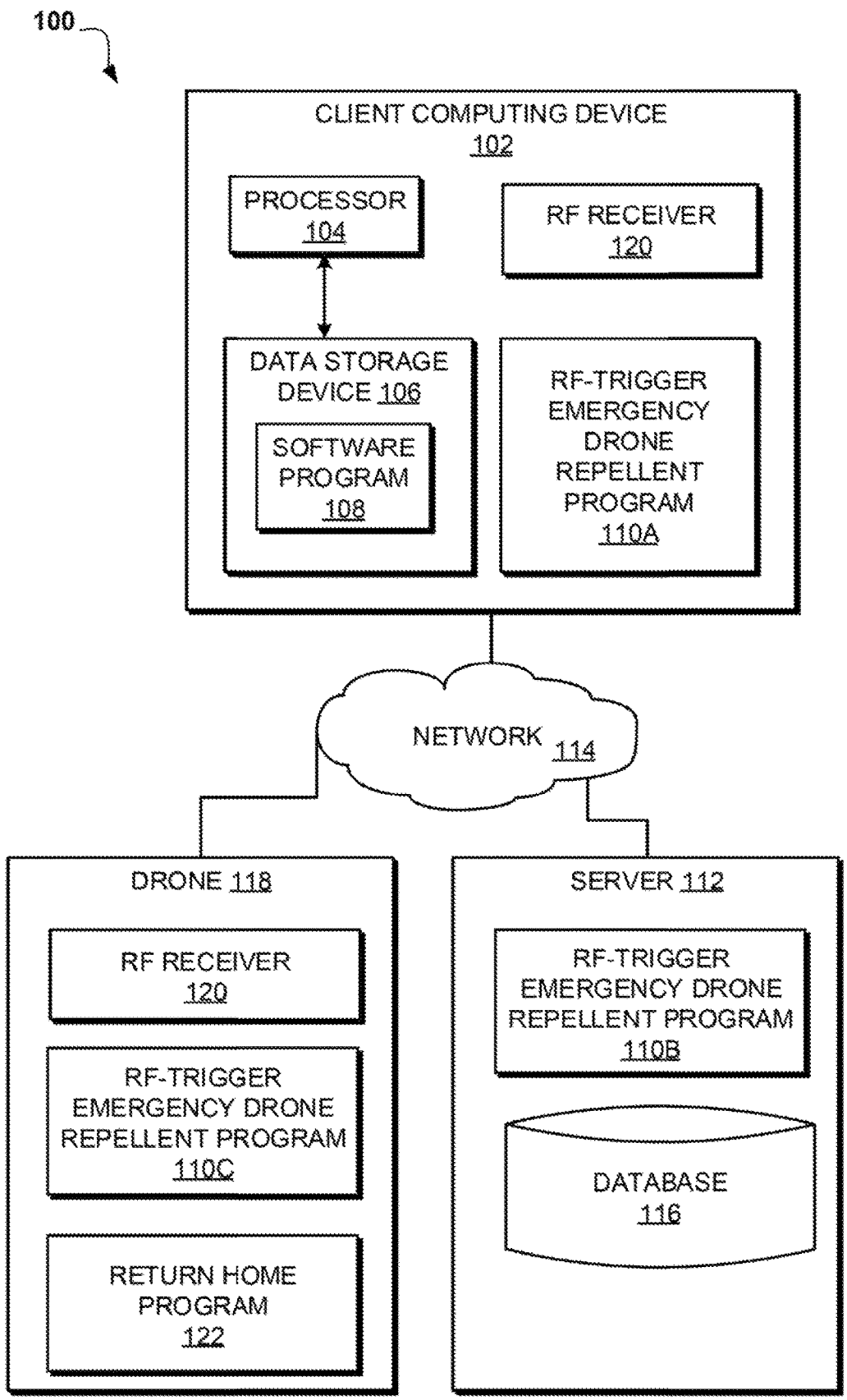
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to emergency drone control systems. The following described exemplary embodiments provide a system, method, and program product to utilize an unused radio frequency that can be utilized for emergency cases to send a signal that triggers the "home" feature in each drone in such emergency cases. Therefore, the present embodiment has the capacity to improve the technical field of emergency drone control systems by sending signals to every drone flying within a pre-determined radius of a vehicle or a forbidden area to maintain a distance outside of the pre-determined radius, thus, avoiding accidents caused by drones.

As previously described, unmanned vehicles, including land, air, or sea-based vehicles, are typically combined with a client computing device and a system of communications between them. The use of unmanned vehicles may operate with various degrees of autonomy: either under remote control by a human operator or autonomously by onboard computers. The use of unmanned vehicles is rapidly expanding to commercial, scientific, recreational, agricultural and other various applications. Unmanned vehicles are now used for surveillance, product deliveries, aerial photography and racing for leisure. Unmanned vehicles are typically equipped with position and movement sensors to monitor information about the aircraft state. Non-cooperative sensors are able to detect targets autonomously, so they are used for separation assurance and collision avoidance. Most unmanned vehicles use radio frequencies for remote control and exchange of video and other data. Although references hereinafter are made with reference to aerial unmanned vehicle (i.e., drone vehicles), embodiments of the disclosed invention may not be limited to aerial vehicles but also land-based and sea-based unmanned vehicles, for example.

Drones have become so popular that companies are evolving their business models so they can benefit from the quick transportation media provided by drone technologies for their product deliveries. As this trend increases and more and more individuals adhere to this technology some problems may arise. For example, during emergency calls, hospitals tend to send helicopters to quickly rescue patients that need immediate treatment and, with drones posing as potential hazardous obstruction to a manned vehicle's flight path, problems may arise during either takeoff, landing, or travel to a destination. Drone collisions with large manned aircraft can cause significant structural damage thereby compromising aircraft integrity and passenger safety. Some situations faced by helicopter pilots during a rescue mission may result in hazardous situations involving drones in their way. As such, it may be advantageous to, among other things, implement a system capable of sending drones away when there is an emergency or rescue taking place nearby, utilizing an unused radio frequency and a "return-home" feature embedded in a drone.

According to one embodiment, the current invention may utilize short-wave broadcasting bands in a pre-configured range of a vehicle that may activate "return-home" keys through a radio frequency trigger in every drone within receiving distance of the broadcast bands and "lock" each drone in a disabled state until the emergency signal from the vehicle is completely unreachable.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for triggering drones to clear skies for emergency vehicles by utilizing a radio frequency trigger.

Referring to FIG. 1, an exemplary networked computer environment 100 is depicted, according to at least one embodiment. The networked computer environment 100 may include client computing device 102 and a server 112, and a drone 118 interconnected via a communication network 114. According to at least one implementation, the networked computer environment 100 may include a plurality of client computing devices 102 and servers 112, and drones 118 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108, an RF receiver 120 and an RF-trigger emergency drone repellent program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively. According to one embodiment, RF receiver 120 may be a sensor capable of detecting or receiving a pre-configured range of radio frequency in an emergency situation and transmitting such information to the RF-trigger emergency drone repellent program 110A.

The server computer 112 may be a laptop computer, netbook computer, personal computer (PC), a desktop computer, or any programmable electronic device or any network of programmable electronic devices capable of hosting and running an RF-trigger emergency drone repellent program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The drone 118 may be an unmanned aerial vehicle that is configured to be controlled by a client computing device 102 and may include an RF receiver 120, an RF-trigger emergency drone repellent program 110C and a return home program 122. According to one embodiment, the RF receiver 120 may incorporate an array of sensors capable of detecting and capturing specific ranges of radio frequency required for commanding the RF-trigger emergency drone repellent program 110C to respond to emergency signals. A return home program 122 may be a program capable of commanding a drone to return home when the RF-trigger emergency drone repellent program 110C may determine that there is an emergency signal and drones need to clear a path. The drone 118 may interact with the server 112 and store any information that the RF-trigger emergency drone repellent program 110C may receive or process in the database 116. In another embodiment, the drone 118 may be equipped with its own database, connected either internally or externally, to store video or graphical data that the drone 118 may capture.

According to the present embodiment, the RF-trigger emergency drone repellent program 110A, 110B, 110C may be a program capable of receiving emergency radio frequency signals from emergency call centers and processing the radio frequency signal to trigger a drone to fly away until the signal subdues or expires. In another embodiment, the RF-trigger emergency drone repellent program 110A, 110B, 110C may also command a drone to return to a place where it was originally launched, or any other place designated by a user. The RF-trigger emergency drone repellent program 110A, 110B, 110C may further notify a user when the user drone is determined to be in an emergency zone and required to clear the way or return home. The RF-trigger emergency drone repelling process is explained in further detail below with respect to FIG. 2.

Figure 2:
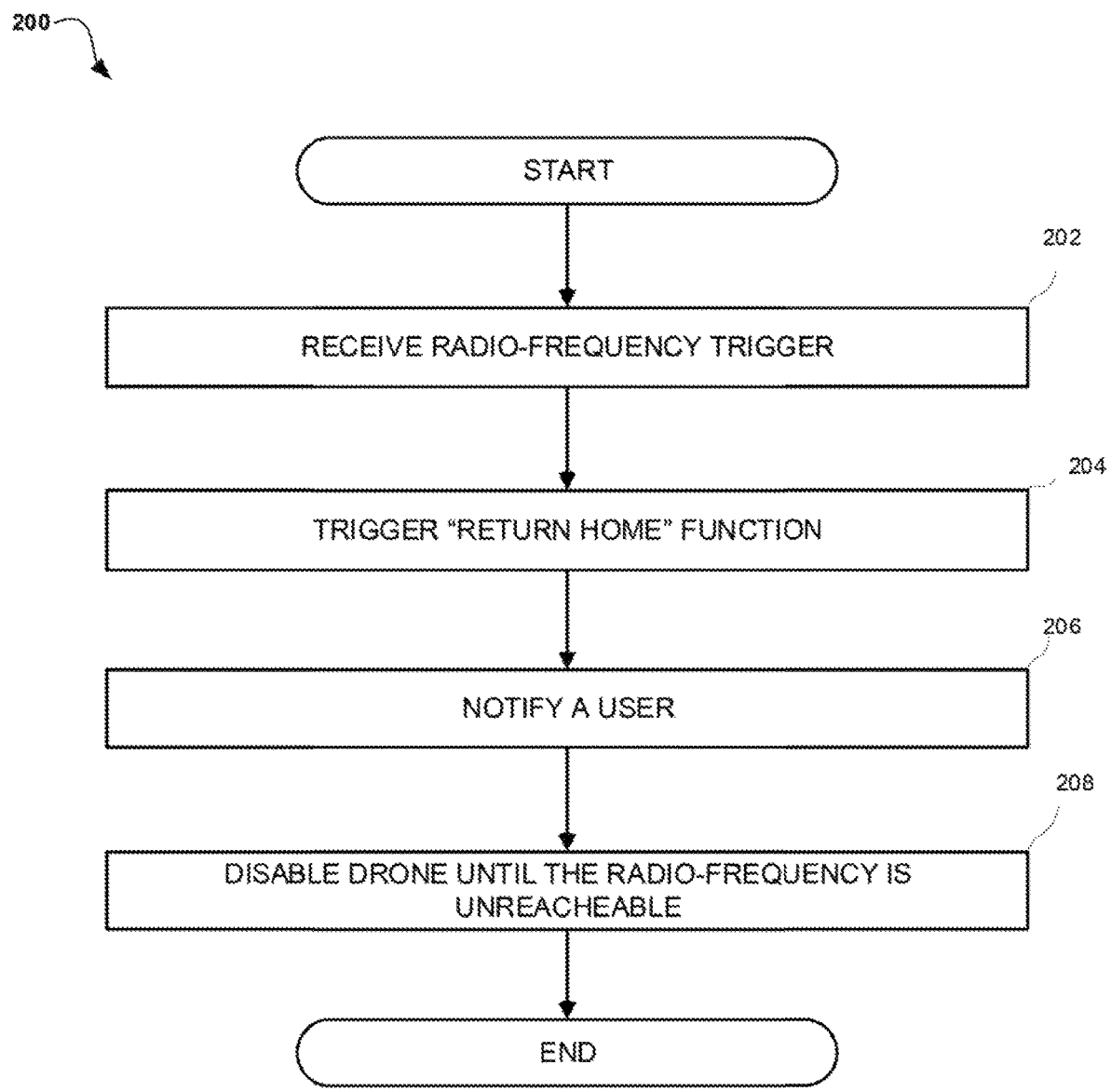
FIG. 2 is an operational flowchart illustrating an emergency radio frequency triggered drone control process according to at least one embodiment.

FIG. 2 is an operational flowchart illustrating an emergency radio frequency triggered drone control process according to at least one embodiment. At 202, the RF-trigger emergency drone repellent program 110A, 110B, 110C receives a radio frequency trigger. According to one embodiment, the RF-trigger emergency drone repellent program 110A, 110B, 110C may receive a radio-frequency trigger transmitted from the emergency call center, emergency vehicles or rescue helicopters. For example, the RF-trigger emergency drone repellent program 110A, 110B, 110C may utilize a radio frequency device or sensor, such as an RF receiver 120, which may include a radio frequency reader that may transmit a radio frequency signal over a first communication channel to the radio frequency device when a drone travels within a preconfigured range of the radio frequency reader. The RF receiver 120 then may generate a trigger signal in response to the radio frequency signal and transmit the trigger signal to the RF-trigger emergency drone repellent program 110A, 110B, 110C. In another embodiment, the RF-trigger emergency drone repellent program 110A, 110B, 110C may utilize a high-power RF relay switch including a relay connected to carry the input high power RF and having at least two pin diodes connected in opposed polarity such that a trigger process may not latch up at any of emergency radio frequencies and the high-power RF relay switch may ensure the proper operation for the correct length of time throughout the entire emergency radio frequency.

At 204, the RF-trigger emergency drone repellent program 110A, 110B, 110C triggers a "return home" function. According to one embodiment, the RF-trigger emergency drone repellent program 110A, 110B, 110C may transmit trigger information to a return home program 122 and the return home program 122 may command a drone to return home or fly to a pre-configured safety zone and perform a "hover" function. In one other embodiment, the RF-trigger emergency drone repellent program 110A, 110B, 110C may command a drone to perform a predetermined, programmed function, such as immediately landing or hovering in one position throughout the length of emergency signals. The RF-trigger emergency drone repellent program 110A, 110B, 110C may command a drone to land directly below the drone's current position or near the current position where the drone may land safely while avoiding any obstacles. Once the RF-trigger emergency drone repellent program 110A, 110B, 110C transmits a "go home" command, the return home program 122 may override any other drone control by a user and notify the user of such state.

At 206, the RF-trigger emergency drone repellent program 110A, 110B, 110C notifies a user. According to one embodiment, the RF-trigger emergency drone repellent program 110A, 110B, 110C may notify a user that the user drone is required to return home or perform any other programmed escape-related action due to the drone's proximity to the radio frequency trigger. In one other embodiment, the RF-trigger emergency drone repellent program 110A, 110B, 110C may notify a user again when the user drone completes the "return home" function. Once the drone lands safely or is outside of the preconfigured radial distance from the radio frequency trigger, the RF-trigger emergency drone repellent program 110A, 110B, 110C may active a counter that may check if the emergency signal is no longer detected. Such a counter may be pre-programmed in the RF receiver 120.

At 208, the RF-trigger emergency drone repellent program 110A, 110B, 110C disables a drone until the emergency radio frequency is unreachable. According to one embodiment, the RF-trigger emergency drone repellent program 110A, 110B, 110C may disable a user drone until the RF receiver 120 determines that there is no longer a detectable emergency frequency within a pre-configured range or radius. The RF-trigger emergency drone repellent program 110A, 110B, 110C may override a user control until the RF receiver 120 determines that there is no detectable emergency radio frequency within said range. In one other embodiment, the RF-trigger emergency drone repellent program 110A, 110B, 110C may interact with a remote drone controller and disable the function of the remote controller until an emergency signal is undetectable or unreachable. The RF-trigger emergency drone repellent program 110A, 110B, 110C may also notify a user that user control over the drone may be reinitiated when the RF receiver 120 determines that no emergency radio frequency is detected.

It may be appreciated that FIG. 2 provides only an illustration of one implementation and do not imply any limitations with regard to how different embodiments may be implemented. Many modifications to the depicted environments may be made based on design and implementation requirements. For example, in at least one embodiment, the RF-trigger emergency drone repellent program 110A, 110B, 110C may receive an emergency radio frequency and transmit or relay the same radio frequency to other drones flying or positioned within a pre-configured distance. In at least one other embodiment, the RF-trigger emergency drone repellent program 110A, 110B, 110C may be utilized to relocate land-based vehicles, such as self-driving vehicles, when a vehicle of importance, such as an ambulance or police vehicle, approaches.

Figure 3:
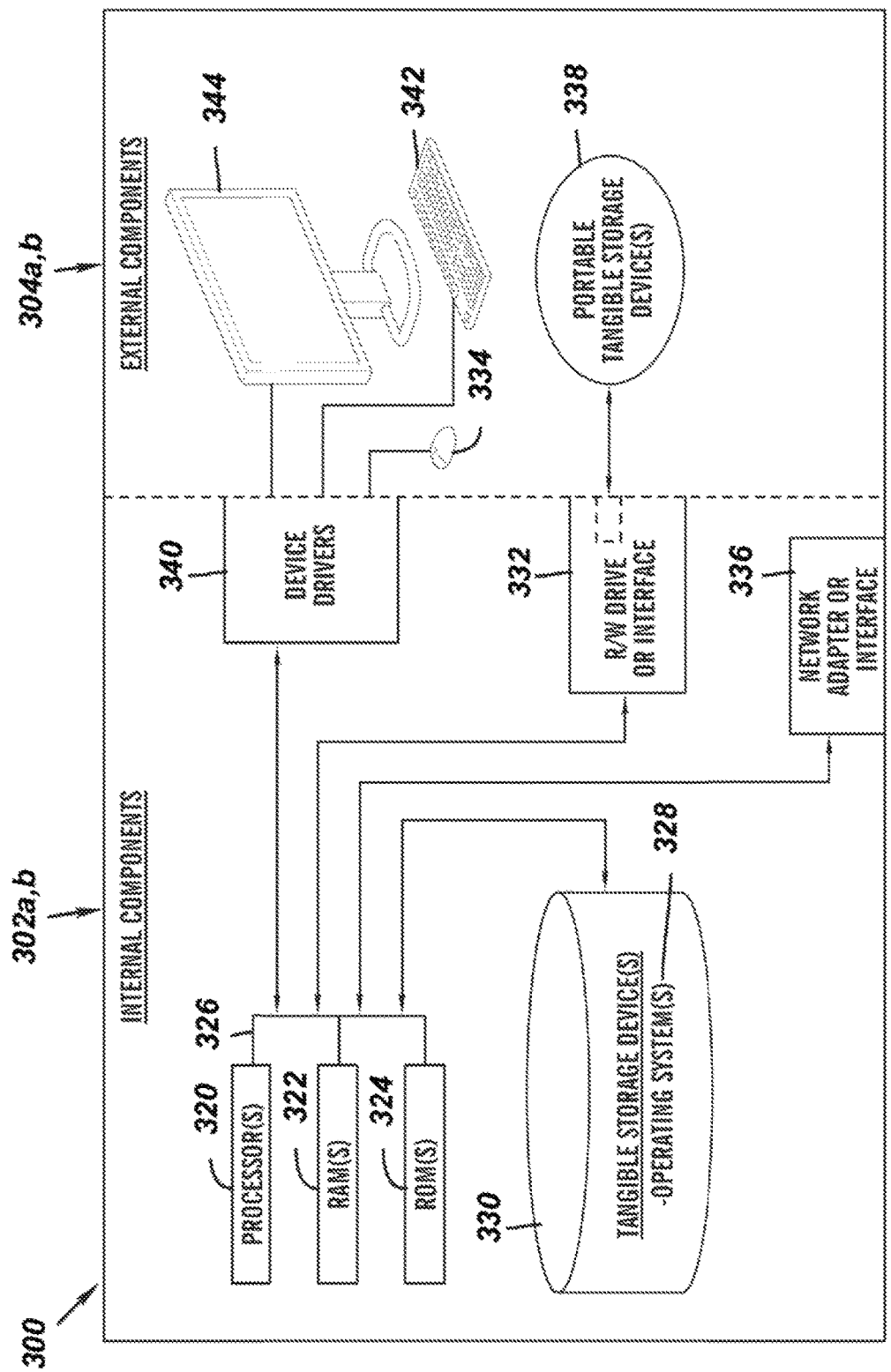
FIG. 3 is a block diagram of internal and external components of client computing device, server, and drone as depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smartphone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 308 and the RF-trigger emergency drone repellent program 110A in the client computing device 102, the RF-trigger emergency drone repellent program 110B in the server 112, and the RF-trigger emergency drone repellent program 110C in the drone 118 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes an R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as RF-trigger emergency drone repellent program 110A, 110B, 110C can be stored on one or more of the respective portable computer-readable tangible storage devices 338, read via the respective R/W drive or interface 332 and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the RF-trigger emergency drone repellent program 110A in the client computing device 102, the RF-trigger emergency drone repellent program 110B in the server 112, and the RF-trigger emergency drone repellent program 110C in the drone 118 can be downloaded to the client computing device 102 and the server 112 from an external computer via a network (for example, the Internet, a local area network or other, wide area network) and respective network adapters or interfaces 336. From the network adapters or interfaces 336, the software program 108 and the RF-trigger emergency drone repellent program 110A in the client computing device 102, the RF-trigger emergency drone repellent program 110B in the server 112, and the RF-trigger emergency drone repellent program 110C in the drone 118 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 4:
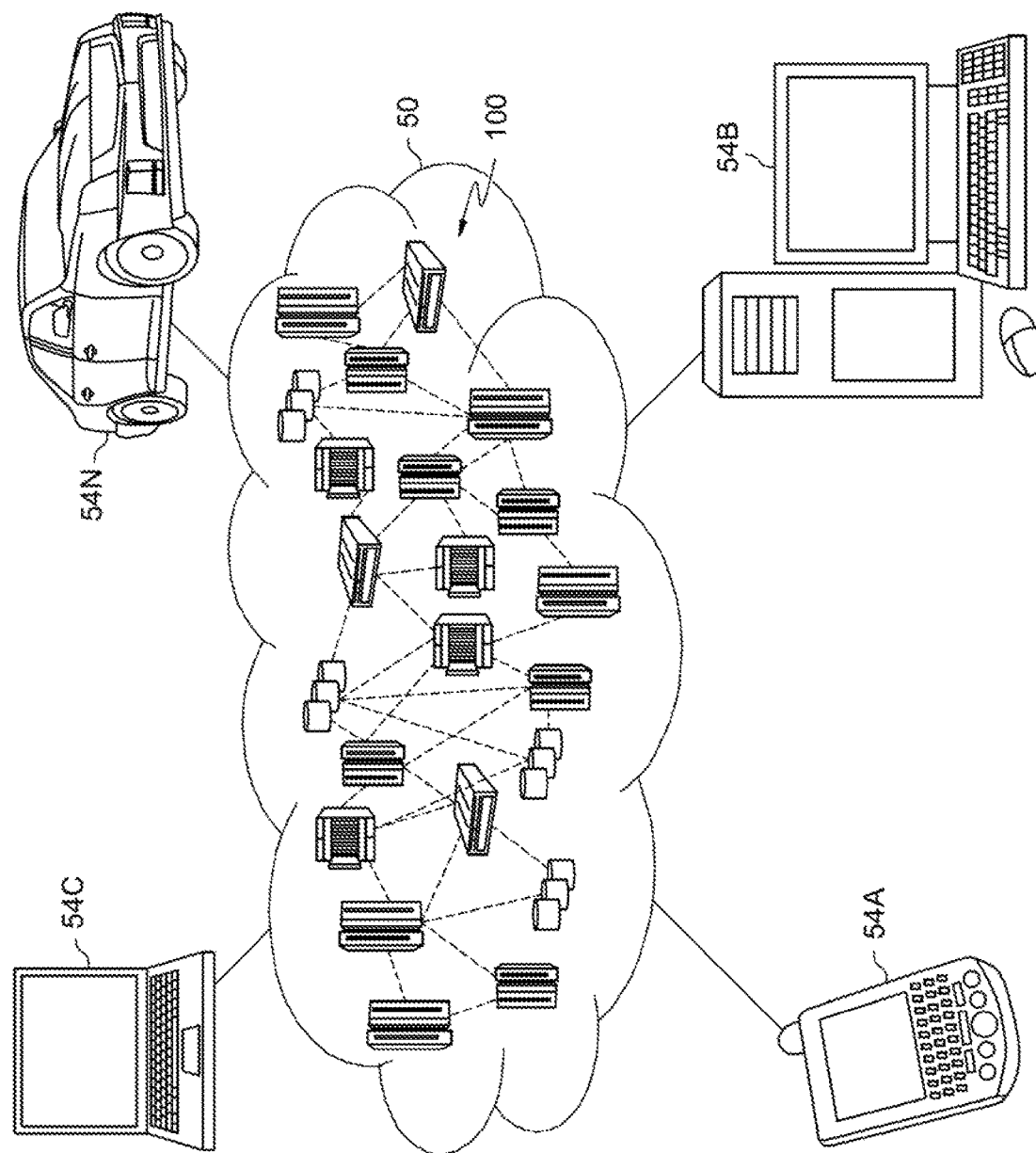
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
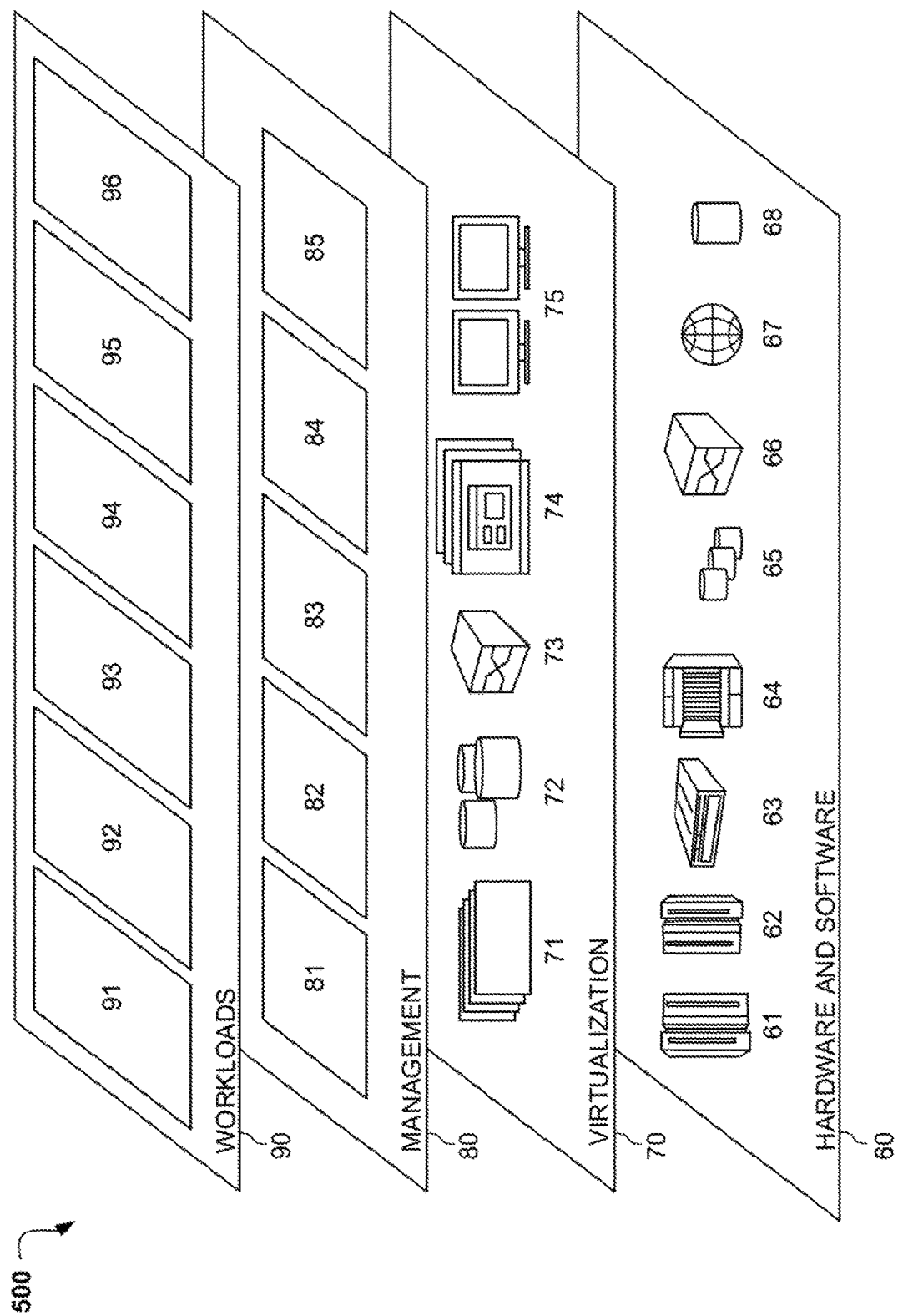
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and RF-trigger emergency drone repellent 96. RF-trigger emergency drone repellent 96 may relate to detecting an emergency radio frequency and commanding a drone to a safe zone until such emergency radio frequency disappears or becomes undetectable.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for using a radio frequency trigger to move an unmanned aerial vehicle from an incoming vehicle path, the method comprising:
   receiving, by a processor, a radio frequency signal transmitted from a vehicle or an emergency response center, wherein a high-power radio frequency relay switch having at least two pin diodes connected in opposed polarity is used to ensure a proper operation of the unmanned aerial vehicle throughout duration of the radio frequency signal transmitted from the vehicle or the emergency response center;
   determining whether an unmanned aerial vehicle is in flight within a pre-configured threshold radius from the first responder vehicle or emergency response center;
   in response to determining the unmanned aerial vehicle is within the pre-configured radius, activating a "return home" function; and
   commanding the unmanned aerial vehicle to fly out of the threshold radius.

2. The method of claim 1, further comprising:
   disabling the unmanned aerial vehicle until the radio frequency signal is no longer detected or out of the threshold radius.

3. The method of claim 1, further comprising:
   overriding a user control of the unmanned aerial vehicle when activating the "return home" function.

4. The method of claim 1, further comprising:
   notifying a user when the user unmanned aerial vehicle is commanded to return home.

5. The method of claim 1, further comprising:
   sending the unmanned aerial vehicle to a pre-programmed safe zone or a specific location designated by a user.

6. The method of claim 1, further comprising:
   determining whether the emergency radio frequency is no longer detectable; and
   in response to the emergency radio frequency being no longer detectable, notifying a user a normal operation mode of the unmanned aerial vehicle will resume.

7. The method of claim 1, further comprising:
   transmitting the emergency radio frequency to one or more unmanned aerial vehicles that are concurrently in flight within a pre-configured threshold radius from the unmanned aerial vehicle.

8. A computer system for moving an unmanned aerial vehicle from an incoming vehicle path using a radio frequency trigger, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   receiving, by a processor, a radio frequency signal transmitted from a vehicle or an emergency response center, wherein a high-power radio frequency relay switch having at least two pin diodes connected in opposed polarity is used to ensure a proper operation of the unmanned aerial vehicle throughout duration of the radio frequency signal transmitted from the vehicle or the emergency response center;
determining whether an unmanned aerial vehicle is in flight within a pre-configured threshold radius from the first responder vehicle or emergency response center;
in response to determining the unmanned aerial vehicle is within the pre-configured radius, activating a "return home" function; and
commanding the unmanned aerial vehicle to fly out of the threshold radius.

9. The computer system of claim 8, further comprising:
disabling the unmanned aerial vehicle until the radio frequency signal is no longer detected or out of the threshold radius.

10. The computer system of claim 8, further comprising:
overriding a user control of the unmanned aerial vehicle when activating the "return home" function.

11. The computer system of claim 8, further comprising:
notifying a user when the user unmanned aerial vehicle is commanded to return home.

12. The computer system of claim 8, further comprising:
sending the unmanned aerial vehicle to a pre-programmed safe zone or a specific location designated by a user.

13. The computer system of claim 8, further comprising:
determining whether the emergency radio frequency is no longer detectable; and
in response to the emergency radio frequency being no longer detectable, notifying a user a normal operation mode of the unmanned aerial vehicle will resume.

14. The computer system of claim 8, further comprising:
transmitting the emergency radio frequency to one or more unmanned aerial vehicles that are concurrently in flight within a pre-configured threshold radius from the unmanned aerial vehicle.

15. A computer program product for moving an unmanned aerial vehicle from an incoming vehicle path using a radio frequency trigger, the computer program product comprising:
one or more computer-readable tangible storage media and program instructions stored on at least one of the one or more tangible storage media, the program instructions executable by a processor of a computer to perform a method, the method comprising:
receiving, by a processor, a radio frequency signal transmitted from a vehicle or an emergency response center, wherein a high-power radio frequency relay switch having at least two pin diodes connected in opposed polarity is used to ensure a proper operation of the unmanned aerial vehicle throughout duration of the radio frequency signal transmitted from the vehicle or the emergency response center;
determining whether an unmanned aerial vehicle is in flight within a pre-configured threshold radius from the first responder vehicle or emergency response center;
in response to determining the unmanned aerial vehicle is within the pre-configured radius, activating a "return home" function; and
commanding the unmanned aerial vehicle to fly out of the threshold radius.

16. The computer program product of claim 15, further comprising:
disabling the unmanned aerial vehicle until the radio frequency signal is no longer detected or out of the threshold radius.

17. The computer program product of claim 15, further comprising:
overriding a user control of the unmanned aerial vehicle when activating the "return home" function.

18. The computer program product of claim 15, further comprising:
notifying a user when the user unmanned aerial vehicle is commanded to return home.

19. The computer program product of claim 15, further comprising:
determining whether the emergency radio frequency is no longer detectable; and
in response to the emergency radio frequency being no longer detectable, notifying a user a normal operation mode of the unmanned aerial vehicle will resume.

20. The computer program product of claim 15, further comprising:
transmitting the emergency radio frequency to one or more unmanned aerial vehicles that are concurrently in flight within a pre-configured threshold radius from the unmanned aerial vehicle.

* * * * *